(12) United States Patent
Lorthioir et al.

(10) Patent No.: US 7,611,179 B2
(45) Date of Patent: **\*Nov. 3, 2009**

(54) REMOVABLE GRIPPING DEVICE WHICH DOES NOT REQUIRE THE USER TO ALTER HIS/HER GRIP THEREON

(75) Inventors: Christophe Lorthioir, Albens (FR); Michel Montgelard, Cran Gevrier (FR)

(73) Assignee: Seb SA, Ecully (FR)

( * ) Notice: Subject to any disclaimer, the term of this patent is extended or adjusted under 35 U.S.C. 154(b) by 378 days.

This patent is subject to a terminal disclaimer.

(21) Appl. No.: 10/521,907

(22) PCT Filed: Jul. 16, 2003

(86) PCT No.: PCT/FR03/02249

§ 371 (c)(1),
(2), (4) Date: Sep. 19, 2005

(87) PCT Pub. No.: WO2004/010831

PCT Pub. Date: Feb. 5, 2004

(65) Prior Publication Data

US 2006/0081136 A1   Apr. 20, 2006

(30) Foreign Application Priority Data

Jul. 24, 2002   (FR)   .................................. 02 09383

(51) Int. Cl.
*A47J 45/10* (2006.01)

(52) U.S. Cl. ........................ 294/34; 294/31.1; 220/759; 16/425

(58) Field of Classification Search .................... 294/28, 294/34, 27.1, 31.1; 16/425; 220/759; D7/395, D7/688
See application file for complete search history.

(56) References Cited

U.S. PATENT DOCUMENTS

| 929,819 | A | * | 8/1909 | Bertram | ...................... 294/31.1 |
| 1,151,672 | A | * | 8/1915 | Donnelly | ...................... 294/34 |
| 2,577,676 | A | * | 12/1951 | Chance | ......................... 294/33 |
| 5,704,092 | A | * | 1/1998 | Nicollet et al. | ................. 16/425 |
| 6,000,100 | A | * | 12/1999 | Montgelard | ................... 16/425 |
| 6,318,776 | B1 | | 11/2001 | Lee | |

FOREIGN PATENT DOCUMENTS

| FR | 2 739 772 | 4/1997 |
| FR | 2 768 914 | 4/1999 |
| JP | 2002017581 | 1/2002 |

\* cited by examiner

*Primary Examiner*—Paul T Chin
(74) *Attorney, Agent, or Firm*—Bachman & LaPointe, P.C.

(57) ABSTRACT

A removable gripping device for a container has two clamp-forming members which are mounted to a gripping body, one of which can move longitudinally between an open position and a closed position; movement elements which are designed to move the aforementioned mobile member; and actuation devices which can move in relation to the gripping body. The above-mentioned actuation devices are mounted so as to move longitudinally between a rest position and an actuation position, whereby the actuation devices cause a lever to move from the retracted position to the deployed position thereof.

16 Claims, 2 Drawing Sheets

REMOVABLE GRIPPING DEVICE WHICH DOES NOT REQUIRE THE USER TO ALTER HIS/HER GRIP THEREON

CROSS REFERENCE TO RELATED APPLICATION(S)

Applicants hereby claim the benefit of PCT priority application no. PCT/FR2003/002249, filed Jul. 16, 2003, which claims the benefit of French priority application no. 02/09383, filed Jul. 24, 2002.

BACKGROUND OF THE INVENTION

This invention relates to a removable gripping device for a container, particularly a removable handle for a pot or a pan, that can be removed without the user needing to alter his/her grip.

A removable gripping device for a container of the type comprising two members forming a gripper mounted on a gripping body is known, in which one of the members forming the gripper is free to move in translation with respect to the gripping body, along a direction approximately parallel to the longitudinal direction of the gripping body between an open position and a closed position in which the members forming a gripper are adapted to grip an edge of the container, the removable gripping device comprising displacement means adapted to displacing members forming the gripper with respect to each other, said displacement means comprising a lever free to move in rotation with respect to the gripping body between an extended position and a retracted position in which the mobile member forming a gripper is in the closed position, and a transmission means extending between the lever and the mobile member forming a gripper adapted to displacing the mobile member forming a gripper in translation when the lever is pivoted, the removable gripping device comprising actuation means for extension of the lever.

Such removable gripping devices are described in patent applications FR 2 739 772 and FR 2 768 914.

However, when the user wants to release the container from a removable gripping device according to prior art, he needs to alter his grip: rotation of the lever to the extended position caused by activation of the actuation means is hindered by the presence of the fingers or the palm of the hand, and this presence is necessary to impose a back pressure on the gripping body so that the actuation means can be activated by pressure applied by the thumb along a direction approximately normal to the longitudinal direction of the gripping body.

The problem that arises is to make a removable gripping device in which the actuation means are arranged such that the user can manipulate them and move the lever from its retracted position to its extended position without needing to alter his grip, which makes it easier to use.

SUMMARY OF THE INVENTION

The solution proposed to this problem is a gripping device of the type mentioned above, in which the actuation means are separate from the displacement means and are installed in translation on the gripping body along a direction approximately parallel to the longitudinal direction of the gripping body between a rest position and an actuation position in which the actuation means move the lever from its retracted position to its extended position.

Since the actuation means are free to move along a direction approximately parallel to the longitudinal direction of the gripping body, no back pressure is necessary and the user can release the lever while maintaining sufficient minimum grasp to support the gripping body.

According to one particular embodiment, the actuation means in the rest position are closer to the members forming a gripper than they are in the actuation position.

With this arrangement, to manipulate actuation means, the user must move the members forming a gripper away from the actuation means by bending his thumb. Since this maneuver is less natural than pushing the actuation means and bringing them towards the members forming a gripper, this considerably reduces the risks of the lever being extended accidentally.

According to another particular embodiment, the actuation means in the rest position are adapted to lock the lever in the retracted position.

Locking the lever in its retracted position in this manner prevents the members forming the gripper from being opened, even if the user suddenly manipulates the gripping device, and even if, when the members forming the gripper are in the closed position, the displacement means are close to the equilibrium position from which the members forming the gripper are moved towards their open position.

According to another particular embodiment, the gripping device comprises a shaft about which the lever and transmission means are hinged, the shaft means being located close to the end of the lever opposite the end at which the lever is connected to the gripping body, and being free to move in translation in a slit made in the transmission means close to the end of the transmission means opposite the end at which the transmission means is connected to the mobile member forming a gripper.

With this particular arrangement of displacement means, the gripping device can dependably grip the edges of the container with a thickness variable within a relatively large range of between 0.5 and 3.5 mm (corresponding approximately to the movement amplitude of the shaft in the slit).

According to another embodiment, the lever and the transmission means are short, so that the user always has space to hold the gripping body with his ring finger and his little finger, only the index and the middle finger being located at the lever, and so that it reduces the movement amplitude of the lever.

According to another particular arrangement, a coil spring housed in the transmission means is used as an elastic means of the toggle joint mechanism. Consequently, unlike gripping devices according to prior art comprising a leaf spring forming a connecting rod, there is no risk of damage when the edge of the gripped container is thick.

The small moving amplitude of the lever means that the lever and the transmission means may have vertical walls arranged such that even when the lever is in the extended position, the entire mechanism is concealed and protected from any dirt accumulation.

Other special features of the invention will become clearer after reading the following detailed description.

BRIEF DESCRIPTION OF THE DRAWINGS

In the appended figures given as a non-limitative example.

DETAILED DESCRIPTION OF THE PREFERRED EMBODIMENT(S)

Figure 1:
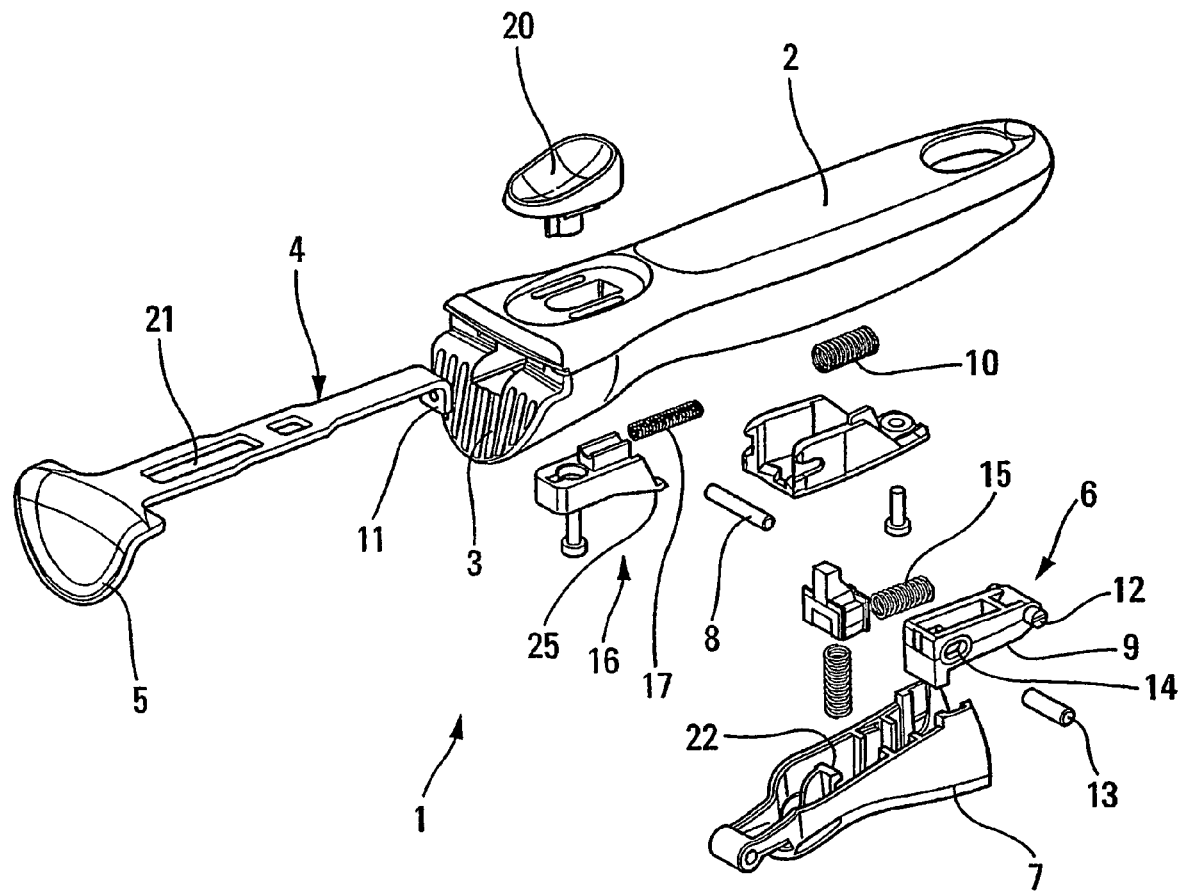
FIG. 1 is an exploded perspective view of a removable gripping device according to this invention.

As can be seen in FIG. 1, a removable gripping device 1 for a container (for example a removable handle for a pot or pan) comprises a gripping body 2 on which two members forming a gripper 3, 4 are formed.

Figure 2:
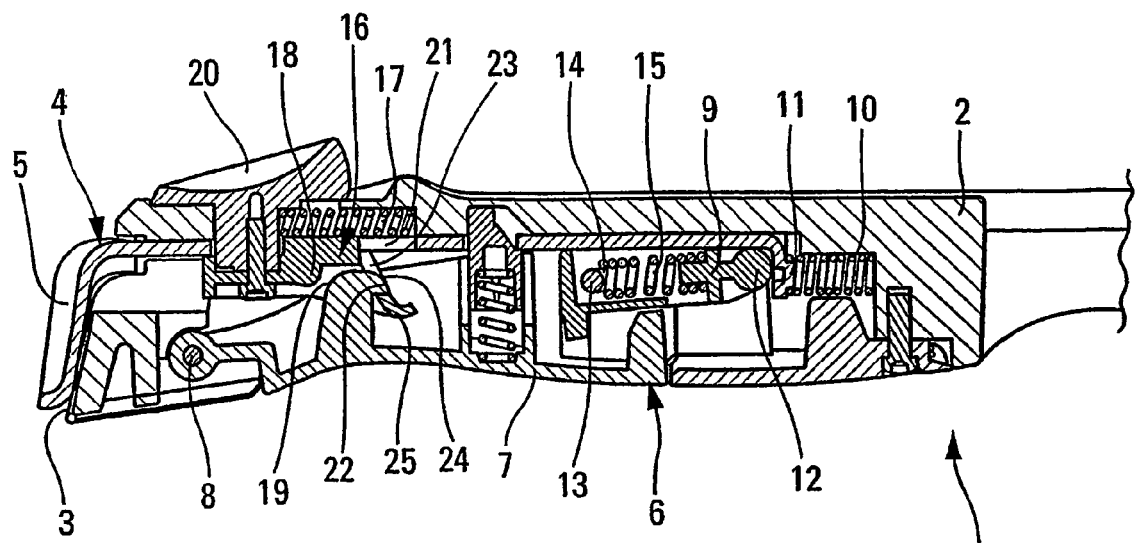
FIG. 2 shows a longitudinal sectional view of a removable gripping device, with the members forming the gripper in the closed position.

A first member forming a gripper 3 is fixed to one end of the gripping body 2, and the second member forming a gripper 4 is installed free to move in translation with respect to the gripping body 2, between an open position (FIG. 3) and a closed position (FIG. 2).

The mobile member forming a gripper 4 comprises a gripping end 5 which is adapted to cooperate with the fixed member forming a gripper 3, to grip an edge of the container when the mobile member forming a gripper 4 is in the closed position.

In this embodiment, the fixed member forming a gripper 3 and the gripping end 5 of the mobile member forming a gripper 4 are shaped so as to be able to grip containers for which the upper end of the edge is curved outwards and thus forms a short curved collar.

An opening spring 10 bears in contact with the gripping body 2 and a bearing end 11 of the mobile member forming a gripper 4 opposite the gripping end 5, and permanently tends to move the mobile member forming the gripper 4 towards its open position.

The removable gripping device 1 comprises displacement means 6 that are adapted to move the mobile device forming a gripper 4 with respect to the gripping body 2.

These displacement means 6 comprise a lever 7 installed free to move in rotation about a rotation axis 8 with respect to the gripping body 2 between an extended position (FIG. 3) and a retracted position (FIG. 2). The rotation axis 8 is normal to the longitudinal direction of the gripping body 2 and is located close to the fixed member forming the gripper 3 and close to a first end of the lever 7.

In this example, when the lever 7 is in its retracted position, it is completely within the gripping body so that the user cannot manipulate it.

When the lever 7 is in the extended position, the mobile member forming a gripper 4 is in the open position, and when it is in the retracted position, the mobile member forming a gripper 4 is in the closed position.

The displacement means 6 also include a transmission means 9 that extends between the lever 7 and the mobile member forming a gripper 4 and that is adapted to moving the mobile member forming a gripper 4 in translation when the lever 7 is pivoted.

Figure 3:
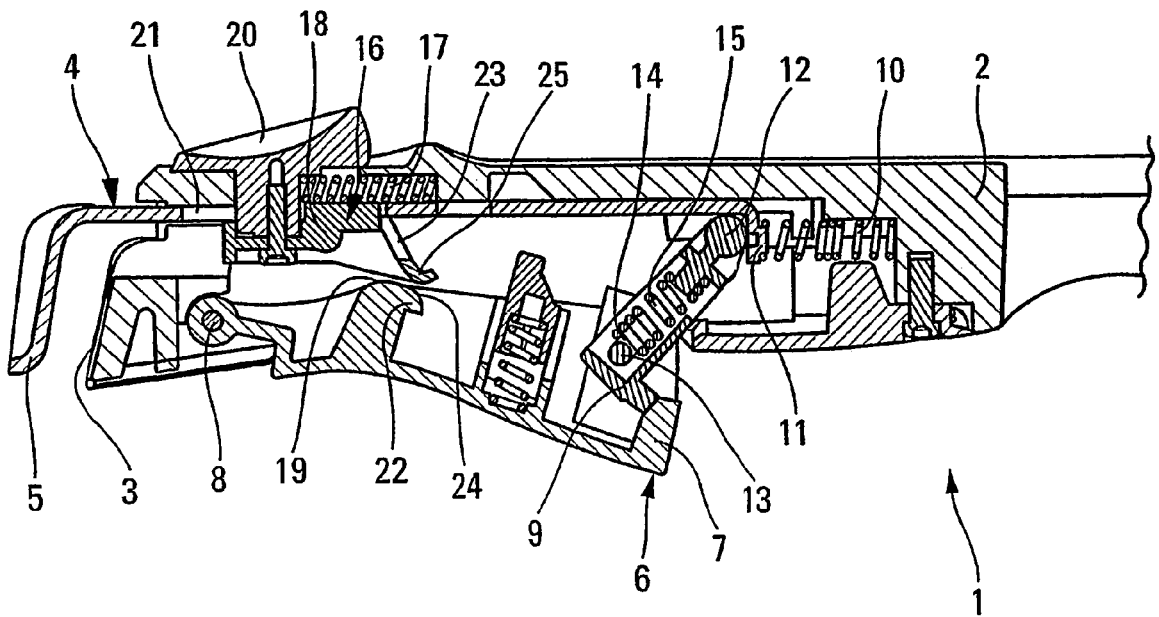
FIG. 3 is a longitudinal sectional view of a removable gripping device, the members forming the gripper being in the open position.

In the example illustrated in FIGS. 1 to 3, the transmission means 9 is a connecting rod 9 and the displacement means 6 are arranged as a toggle joint: the displacement means 6 are shaped such that the lever 7 is in a stable equilibrium position when it is in the extended position and when it is in the retracted position, and it passes through an unstable equilibrium position (defined by the equilibrium line of the displacement means 6) when it passes from one of these two stable equilibrium positions to the other.

Compared with the mobile member forming a gripper 4, the connecting rod 9 is free to rotate about a pivot axis 12 adjacent to the bearing end 11 of the mobile member forming a gripper 4 and adjacent to a first end of the connecting rod 9.

The connecting rod 9 is free to move in rotation with respect to the lever 7, about a shaft 13. The shaft 13 is free to move in translation in a slit 14 made in the connecting rod 9 and that extends in the longitudinal direction of the connecting rod, in order to maintain the relation as a toggle joint. The shaft 13 is free to move between an unstable equilibrium position in which the shaft 13 is located on the equilibrium line of the toggle joint mechanism defined by the rotation axis 8 and the pivot axis 12 and a stable equilibrium position in which the lever 7 is either in its extended position (the shaft 13 being on the so-called open side of the equilibrium line), or in its retracted position (the shaft 13 being located on the so-called closed side of the equilibrium line).

A toggle joint spring 15 permanently tends to move the shaft 13 towards its stable equilibrium position.

When the shaft 13 is located on the open side of the equilibrium line, the opening spring 10 firstly tends to move the mobile member forming a gripper 4 towards its open position, and secondly to move the lever 7 towards its extended position through the connecting rod 9.

When the shaft 13 is located on the closed side of the equilibrium line, the opening spring 10 tends to move the lever 7 towards its retracted position, and firstly forces the lever 7 into contact with the gripping body 2, and secondly forces the connecting rod 9 into contact with the mobile member forming a gripper 4, the toggle joint spring 15 being oriented along a direction very close to the direction of the opening spring 10. Consequently, the toggle joint spring 15 that tends to move the shaft 13 towards its equilibrium position, imposes a translation on the mobile member forming the gripper 4 towards its closed position, despite the presence of the opening spring 10.

When a user wants to grip the edge of a container, he or she positions the edge between the fixed member forming a gripper 3 and the gripping end 5 of the mobile member forming the gripper 4 in the open position, and makes the lever 7 pivot from its extended position into its retracted position. Rotation of the lever 7 causes rotation of the connecting rod 9 and translation of the mobile member forming a gripper 4, the shaft 13 then crossing the equilibrium line of the toggle joint mechanism, so as to obtain a stable grip of the edge of the container.

The free movement of the shaft 13 in the slit 14 enables adjustment of the distance between the gripping end 5 of the mobile member forming a gripper 4 in the closed position and the fixed member forming a gripper 3 at the thickness of the edge of the container.

The range of the distances separating the gripping end of the mobile member forming a gripper 4 in the closed position and the fixed member forming a gripper 3 is significantly less than the movement amplitude of the shaft 13 in the slit 14 so that the shaft 13 can pass the equilibrium line to achieve a stable grip.

According to the embodiment illustrated in FIGS. 1 to 3, the shaft 13 is located close to the second end of the lever 7 opposite the first end close to the rotation axis 8. The slit 14 is made close to the second end of the connecting rod 9 opposite the first end close to the pivot axis 12, the shaft 13 being acted upon by the toggle joint spring 15 tending to move it towards the longitudinal end of the slit 14 that is closest to the second end of the connecting rod 9.

Due to this particular arrangement of displacement means 6, the griping device 1 can reliably grip the edges of the container, for which the thickness can vary within a relatively large range (between 0.5 and 3.5 mm).

Moreover, the use of a coil spring inside the connecting rod 9 acting as a toggle joint spring 15 eliminates any risk of the toggle joint mechanism being damaged, although the range of container edge thicknesses that can be gripped is large.

Furthermore, in order to facilitate gripping of the gripping device 1, even when the lever 7 is in the extended position, the length of the lever 7 is shorter such that a user holding the gripping device 1 will have his or her index finger and middle finger in contact with the lever 7, and the ring finger and little finger in contact with the gripping body. Consequently, the user can release the lever 7 from the gripping area consisting of the index finger and the middle finger, while keeping the ring finger and the little finger in position to hold the gripping body 2. Typically, the length of the lever corresponds to the width of three fingers in contact with each other (or about 7 cm from the rotation axis 8, or about 6 cm for the part of the lever pivoting outside the gripping body 2).

Furthermore, the use of a shorter connecting rod 9 can give a lever 7 with small movement amplitude, making it easier to hold the gripping device 1, even when the lever 7 is in the extended position.

Thus, the user does not need to change his or her grasp when the lever 7 is moved from the extended position to the retracted position, and vice versa.

Advantageously, the lever 7 and the connecting rod 9 include vertical walls arranged such that even when the lever 7 is in the extended position, the mechanism assembly is concealed and protected from any dirt accumulation.

According to this invention, the removable gripping device 1 comprises actuation means 16 separate from the displacement means 6 and installed so as to be free to move in translation on the gripping body 2 along a direction approximately parallel to the longitudinal direction of the gripping body 2.

The actuation means 16 are free to move between a rest position and an actuation position in which the actuation means 16 move the lever 7 from its retracted position to its extended position.

Any return means such as a return spring 17 applying its force on the gripping body 2 and the actuation means 16 continuously tends to move the actuation means 16 towards their rest position.

When they are in the rest position, the actuation means 16 are adapted so as to leave the lever 7 in its retracted stable position (and therefore the members forming the gripper 3, 4 in the closed position), and when they move from their rest position to their actuation position, the actuation means 16 are adapted to stop in contact with the lever 7 and make it pivot until it goes past its unstable equilibrium position.

As can be seen in FIGS. 2 and 3, the lever 7 comprises a bearing surface 19, and the actuation means 16 comprise an element forming an inclined plane 18 that is designed to stop in contact with the bearing surface 19 when the lever 7 is in the retracted position and the actuation means 16 are in the actuation position.

The inclined plane 18 and the bearing surface 19 are shaped such that, when the actuation means 16 move from their rest position to their actuation position, the inclined plane 18 stops in contact with the bearing surface 19 and imposes a pivoting movement on lever 7 about the rotation axis 8 towards its extended position. Pivoting of the lever 7 imposed by the inclined plane is such that the equilibrium point of the toggle joint mechanism is passed, in other words the shaft 13 crosses the equilibrium line. Once the equilibrium has been crossed, the opening spring 10 tends to move the lever 7 towards its extended position and the mobile member forming the gripper 4 towards its open position.

In the example illustrated in FIGS. 1 to 3, the actuation means 16 are closer to the members forming gripper 3, 4 when they are in their rest position than when they are in the actuation position. Furthermore, the inclined plane 18 is arranged between the rotation axis 8 and the bearing surface 19 facing the rotation axis 8, along the longitudinal direction of the gripping body 2.

The actuation means 16 also comprise an activation button 20 that can be manipulated by the user and that projects from the surface of the removable gripping device 1 on the side opposite the side to which the lever 7 is fixed. The mobile member forming a gripper 4 has a groove 21 through which the activation button 20 is fixed to the inclined plane 18 (the activation button 20 and the inclined plane 18 are located on each side of the mobile member forming a gripper 4) such that the movement of the mobile device forming a gripper 4 are not hindered by the actuation means 16, and vice versa.

When the user wants to move the lever 7 from its retracted position to its extended position so as to release the container from the members forming the gripper 3, 4, he or she moves the actuation means 16 in translation as far as the actuation position, using the activation button 20.

The activation button 20 enables the user to maneuver the actuation means 16 without needing to change grip, simply using the thumb. Furthermore, since the actuation means 16 are closer to the members forming the gripper 3, 4 when they are in the rest position than when they are in the actuation position, the user needs to pull the control button 20 towards him when he wants to manipulate the actuation means 16, rather than push it towards the container, which prevents accidental opening by pressing the control button.

Furthermore in the example illustrated in FIGS. 1 to 3, the lever 7 comprises a hook 22 and the actuation means 16 comprise a tab 25 in which an opening 23 is formed. The hook 22 is adapted to engage in the opening 23 when the lever 7 is in the retracted position and the actuation means 16 are in the rest position. Consequently, the actuation means 16 also behave like locking means adapted to lock the lever 7 in the retracted position.

The hook 22 is engaged in the opening 23 by click fitting: when the lever 7 is pivoted from its extended position to its retracted position, an upper surface 24 of the hook 22 stops in contact with the tab 25, and consequently the actuation means 16 are moved in translation towards their actuation position as far as a release position in which the hook 22 is at its opening 23. At this release position, the return spring 17 translates an actuation means 16 in the direction from their rest position, forming the click fitting.

Therefore, the actuation means can lock the lever 7 in its retracted position, which prevents the removable gripping device 1 from being accidentally opened due to a sudden manipulation, which would make it possible for the shaft 13 to go beyond the equilibrium line.

In the example illustrated in FIGS. 1 to 3, the inclined plane 18 is fixed to the tab 25 and the hook 22 is fixed to the bearing surface 19. The inclined plane 18, the bearing surface 19, the hook 22 and the tab 25 are arranged such that the hook 22 is separated from the opening 23 by translation of actuation means 16 towards their actuation position before the inclined plane 18 comes into contact with the bearing surface 19: the hook 22 is oriented in the direction opposite to the rotation axis 8 and it is further from this rotation axis 8 than the bearing surface 19. The tab 25 is at the same height as the hook 22 when the lever 7 is locked by the actuation means 16 and it is inclined such that its face facing rotation axis 8 forms an obtuse angle with the longitudinal direction of the gripping body 2.

Thus, when the user wants to move the lever 7 from its retracted position to its extended position so as to release the container from the members forming the gripper 3, 4, he or she moves the actuation means 16 in translation as far as the actuation position, using the activation button 20. During this translation, the unlocking means 16 pass through their release position in which the hook 22 is no longer engaged in the opening 23. Consequently, the lever 7 is released before the inclined plane 18 stops in contact with the bearing surface 19, such that the lever 7 can pivot towards its retracted position and the mobile member forming a gripper 4 can move into its open position.

Obviously, this invention is not limited to the embodiment described in detail above.

It would be possible to make a removable gripping device not including locking means, in which the transmission means are not a connecting rod.

It would also be possible that the displacement means are not designed to adjust the distance separating the two devices forming a gripper in the closed position, to match the thickness of the gripped container.

It would also be possible to have a removable gripping device, comprising two members forming a gripper mounted on a gripping body, one of the members forming a gripper free to move in translation with respect to the gripping body along a direction approximately parallel to the longitudinal direction of the gripping body, between an open position and a closed position in which the members forming the gripper are adapted to grip an edge of the container, the device also comprising displacement means adapted to displacing the members forming a gripper with respect to each other, said displacement means including a lever installed free to move in rotation with respect to the gripping body between an extended position and a retracted position in which the mobile member forming a gripper is in its closed position, and a transmission means extended between the lever and the mobile member forming a gripper and adapted to move the mobile member forming the gripper in translation when the lever is pivoted, characterized in that the lever is short (as described above, in other words such that the gripping body can be grasped behind the lever by at least the little finger and the ring finger), so that there is no need to change the grip depending on whether the lever is in its extended position or in its retracted position. Preferably, the transmission means (such as the connecting rod) are hinged at the end of the lever opposite the end at which it is hinged to the gripping body. Obviously, this type of gripping device could have any particular characteristics mentioned in this application.

The invention claimed is:

1. A removable gripping device for a container, comprising:
    two members forming a gripper mounted on a gripping body in which of the members forming the gripper is a mobile member which is free to move in translation with respect to the gripping body along a direction approximately parallel to a longitudinal direction of the gripping body between an open position and a closed position in which the mobile member and another member forming the gripper are adapted to grip an edge of the container;
    displacement means for displacing the members forming the gripper with respect to each other, said displacement means comprising a lever free to move in rotation with respect to the gripping body between an extended position and a retraction position in which the mobile member is in the closed position, and a transmission means extending between the lever and the mobile member for displacing the mobile member in translation when the lever is pivoted, and
    means for actuating the lever; the actuating means being separate from the displacement means and being installed free to translate on the gripping body along a direction approximately parallel to the longitudinal direction of the gripping body between a rest position and an actuation position in which the actuating means make the lever move from the retracted position to the extended position, and the displacement means being shaped such that the lever is in a stable equilibrium position when in the retracted position and when in the extended position, and the lever passing through an intermediate unstable equilibrium position when pivoting from one of the two stable equilibrium positions to the other.

2. A removable gripping device according to claim 1, further comprising a return means for continuously applying a force on the actuating means tending to move the actuating means towards the rest position.

3. A removable gripping device according to claim 2, wherein the lever comprises a hook that is adapted to engage in an opening made in the actuating means when the lever is in the retracted position and the actuating means are in the rest position, and adapted to be disengaged from the opening by translation of the actuating means towards the actuation position before releasing the lever.

4. A removable gripping device according to claim 3, wherein the hook comprises an upper surface designed to entrain the actuating means in the direction of the actuation position when the lever pivots towards the retracted position, up to a position enabling click fitting of the hook in the opening.

5. A removable gripping device according claim 1, wherein the actuating means are closer to the members forming the gripper when the actuating means are in the rest position than when the actuating means are in the actuation position.

6. A removable gripping device according to claim 1, wherein the actuating means comprise an element forming an inclined plane that is designed to stop in contact with a bearing surface of the lever when the actuating means are in the actuation position and to impose a rotation movement on lever from the retracted position until the lever passes through the unstable equilibrium position.

7. A removable gripping device according claim 6, wherein the actuating means include an activation button that can be manipulated manually to move the actuating means and that projects from a surface of the gripping body gripping opposite a side to which the lever is fixed.

8. A removable gripping device according to claim 7, wherein the mobile member forming the gripper has a groove through which the activation button is fixed to the inclined plane.

9. A removable gripping device according to claim 1, wherein the actuating means in the rest position are designed to prevent any pivoting movement of the lever from the retracted position to the unstable equilibrium position.

10. A removable gripping device according to claim 9, wherein the actuating means cooperate with the lever by click fitting to lock the lever in the retracted position.

11. A removable gripping device according to claim 1, wherein the displacement means are designed to adjust a distance between the two members forming the gripper in the closed position to match a thickness of the gripped container.

12. A removable gripping device according to claim 11, further comprising a spring designed to act on the mobile member so as to adjust the distance between the two members forming the gripper and the spring being housed in the transmission means.

13. A removable gripping device according to claim 1, wherein the transmission means are formed by a connecting rod that is installed free to move in rotation with respect to the lever and with respect to the mobile member forming the gripper.

14. A removable gripping device according to claim 13, wherein the connecting rod is free to move in rotation with respect to the lever about a shaft that is located close to an end of the lever opposite an end at which the lever is hinged to the gripping body.

15. A removable gripping device according to claim 1, wherein a length of the lever corresponds to a width of three fingers in contact with each other.

16. A removable gripping device according to claim 1, wherein lengths of the lever and the gripping body are such that a user holding the gripping device in his or her hand will have his or her index finger and middle finger in contact with the lever and his or her ring finger and little finger in contact with the gripping body.

* * * * *

UNITED STATES PATENT AND TRADEMARK OFFICE
CERTIFICATE OF CORRECTION

PATENT NO. : 7,611,179 B2
APPLICATION NO. : 10/521907
DATED : November 3, 2009
INVENTOR(S) : Lorthioir et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 865 days.

Signed and Sealed this

Twelfth Day of October, 2010

David J. Kappos
*Director of the United States Patent and Trademark Office*